INVENTORS
RICHARD T. MATOR
JAMES A. PETROCELLI
THOMAS J. PUZNIAK

INVENTORS
RICHARD T. MATOR
JAMES A. PETROCELLI
THOMAS J. PUZNIAK

INVENTORS
RICHARD T. MATOR
JAMES A. PETROCELLI
THOMAS J. PUZNIAK

INVENTORS
RICHARD T. MATOR
JAMES A. PETROCELLI
THOMAS J. PUZNIAK

United States Patent Office 3,550,428
Patented Dec. 29, 1970

3,550,428
METHOD AND APPARATUS FOR SEPARATING MIXTURES OF HYDROCARBONS
Richard T. Mator, Plum Borough Township, Allegheny County, James A. Petrocelli, North Versailles Township, Allegheny County, and Thomas J. Puzniak, Harwick, Pa., assignors to Gulf Research & Development Company, Pittsburgh, Pa., a corporation of Delaware
Filed Dec. 26, 1967, Ser. No. 693,362
Int. Cl. B01d *15/08;* G01n *31/08*
U.S. Cl. 73—23.1                                    13 Claims

ABSTRACT OF THE DISCLOSURE

An automatic hydrocarbon separation and analysis method and apparatus utilizing gas-liquid chromatography. Two columns are utilized, and a valving arrangement to permit backflushing and isolation of components within the system. A circuit is utilized to automatically perform certain calculations to determine the quantities of the various components in the sample. The circuit includes means to sum the individual members of a hydrocarbon group, such as paraffins, and to transform this value proportional to normal paraffins to a signal proportional to total paraffins, as well as means to supply every signal detected for a predetermined period of time so as to assure a final output in easily readable form.

---

Figure 1:
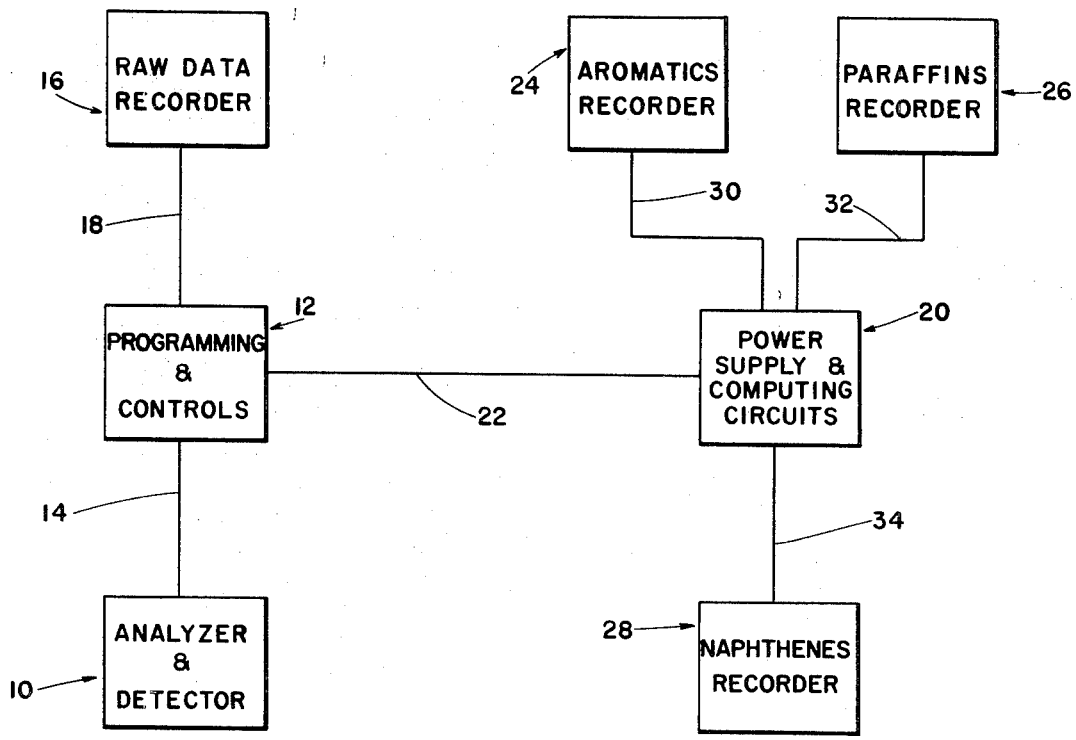

This invention relates to methods and apparatus for separating mixtures of hydrocarbons, and more particularly is directed to means to separate such mixtures that consist of only paraffins, aromatics and naphthenes, and to provide an accurate quantitative determination of the amount of each of said groups of hydrocarbon compounds in the initial mixture.

The invention employs gas-liquid chromatography wherein the mixture of fluids, initially liquid, are transported by a carrier gas through a region of high temperature and through a chromatographic column which is filled with particulate, pulverulent, or porous material, called column packing. The material with which the column is packed retards the passage of the various components therethrough to different degrees which are roughly a function of the logarithm of their respective molecular weights. The retention phenomenon is thought to be due to such factors as molecular sieving, hydrogen bonding, surface adsorption/desorption, chemical solubility, and the like, and combinations thereof.

In its more specific apparatus aspects, the invention comprises a monitoring instrument which utilizes a pair of such chromatographic columns. Feed stocks for reformers which produce gasoline are usually hydrocarbon mixtures containing only paraffins, aromatics and naphthenes. The problem in the prior art to which the present invention is directed concerns reducing the cost of producing the gasoline, and also concerns the production of a gasoline which will produce a reduced amount of air pollutants upon combustion.

If the composition of a reformer feed stock is known, then various conditions in and around the reformer can be adjusted so that the gasoline produced will have a maximum aromatics content. It is known that octane number increases in direct proportion to aromatics content. A high octane number is desirable in the gasoline produced by the reformer because the higher the octane number, the less additives, usually tetraethyl lead (TEL), need be added to raise the octane number to a commercially acceptable value. Thus, by knowing the make-up of the feed stock to the reformer, reformer conditions can be adjusted to maximize aromatics in the gasoline produced, thereby reducing the amount of TEL required, which is a relatively expensive substance, to thereby reduce the cost of producing the gasoline.

The invention comprises a pair of gas-liquid chromatographic (GLC) columns and an arrangement of fluid-handling valves and electronic equipment which will first direct a sample slug of the hydrocarbon mixture to be analyzed through the first column. The first column is packed with a substance which will hold back compounds in the aromatics group. After all paraffins and naphthenes, and other substances which might be in the sample, have exited from the first column, the flow through the first column is reversed so that the aromatic compounds will exit from the original entrance end of the first column as a slug, which is detected and recorded as one peak. Meanwhile, the paraffins and naphthenes have been directed to the second column which is packed with material which will differentiate between normal paraffins, and naphthenes. The circuitry forming part of the apparatus of the invention sums up and determines the total amount of paraffinic compounds from the separation performed by the second column. Once the amounts of the aromatics and paraffins are known, those two amounts are added together and subtracted from unity to determine the amount of naphthenes in the original sample. Suitable means are provided to calibrate the instrument so that unity is proportional to the quantity of the original sample.

Figure 5:
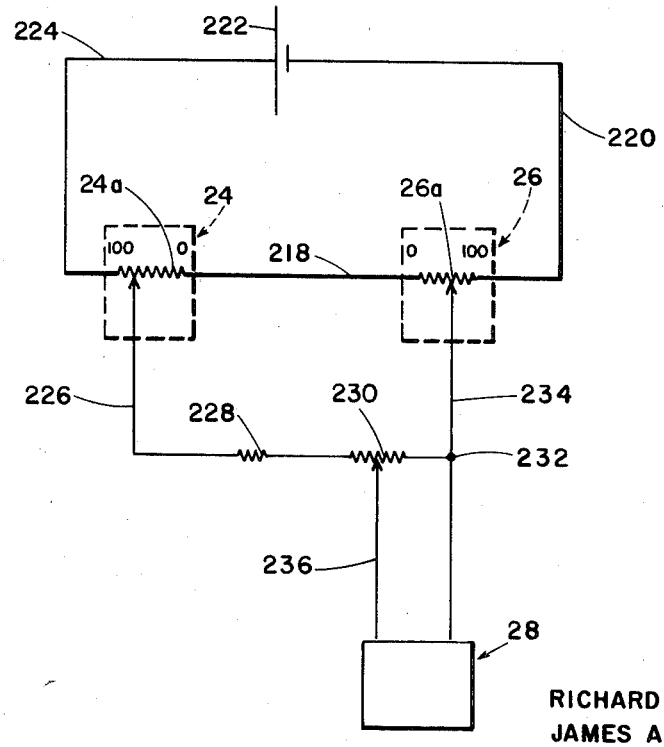
Figure 2:
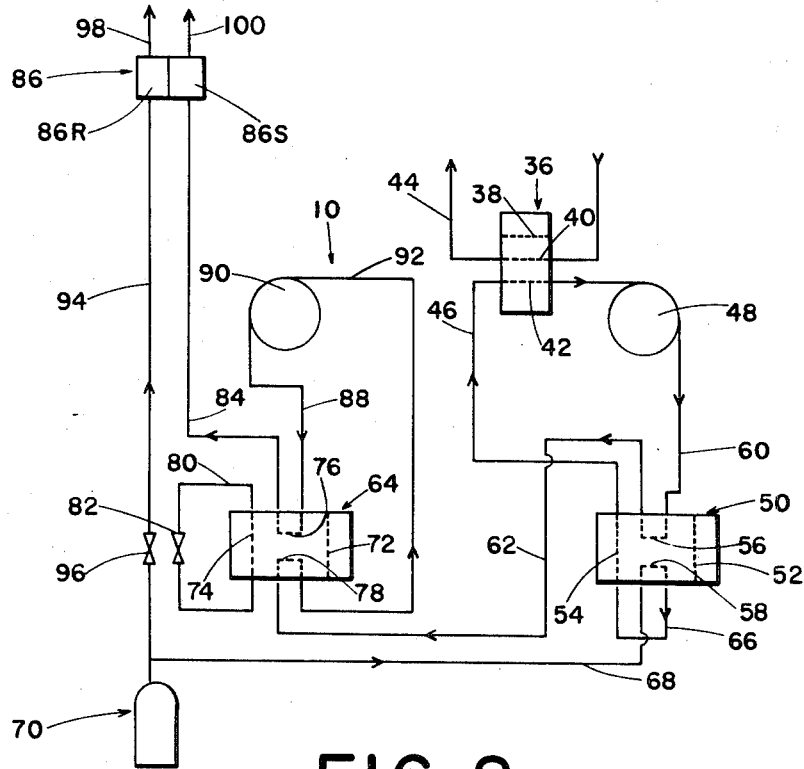
Figure 3:
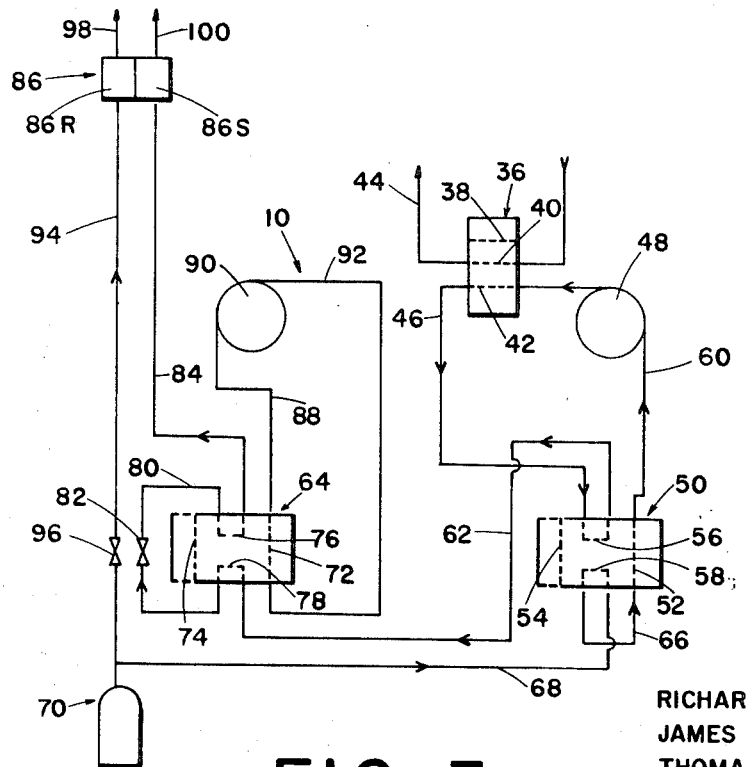
Figure 4:
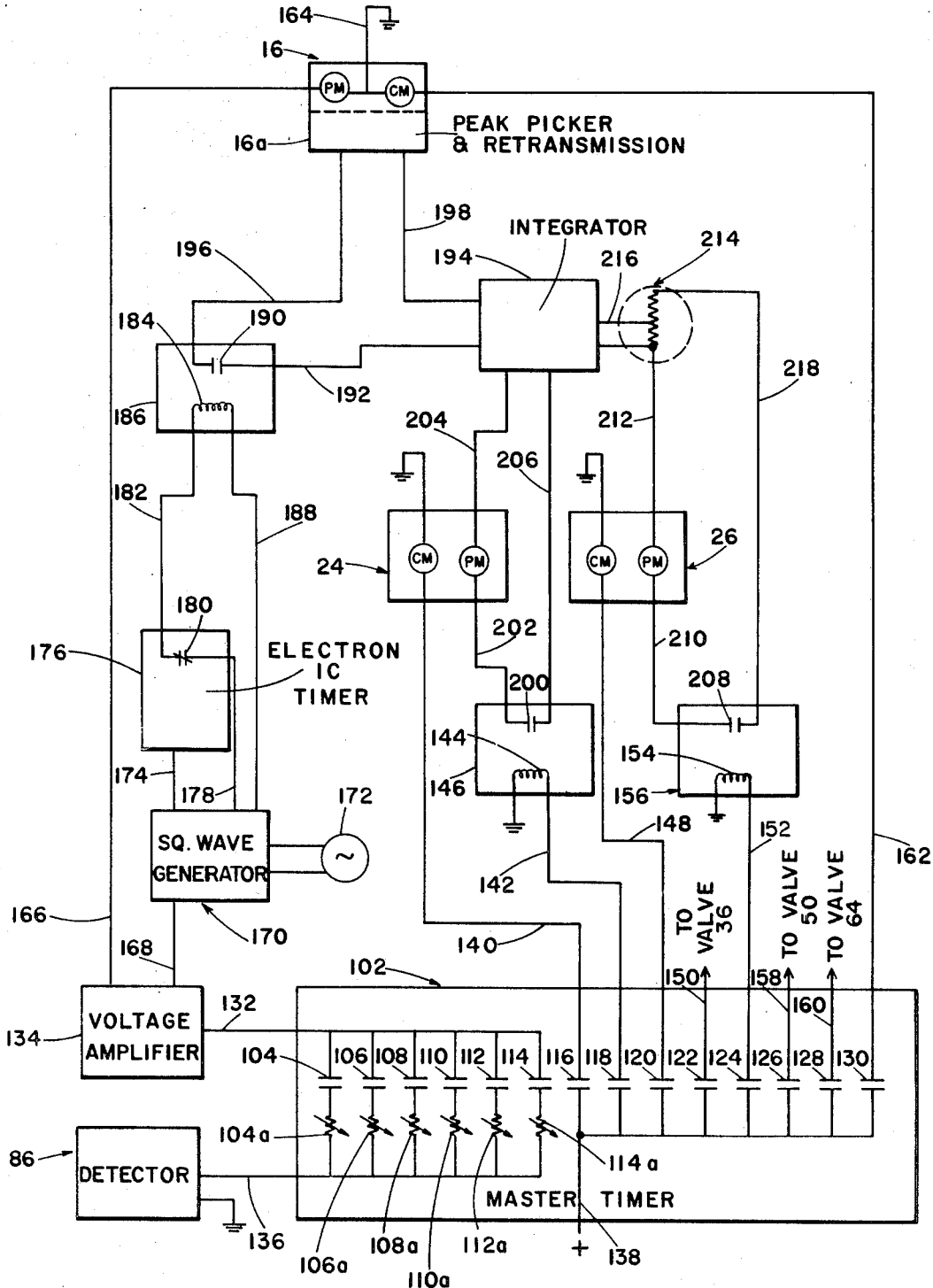
Figure 6:
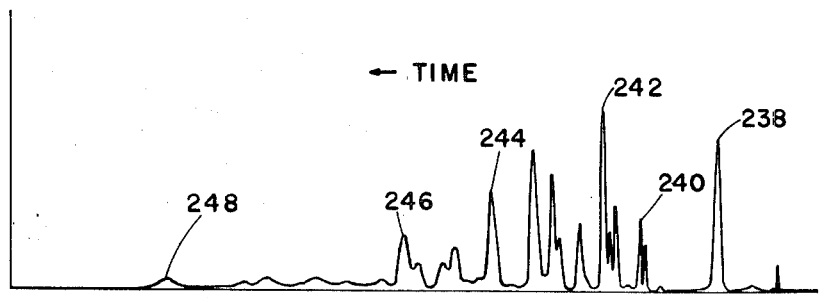
Figure 7:
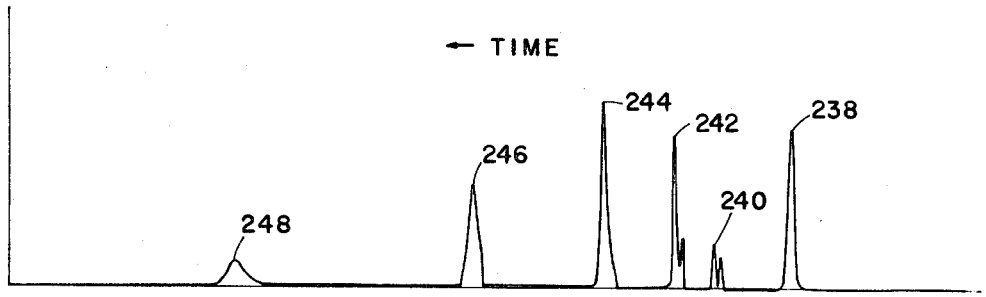
Figure 8:
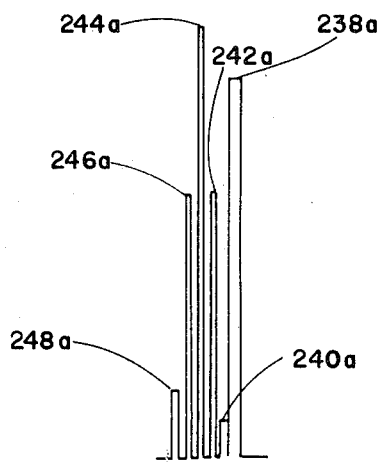

Other advantages of the invention will be pointed out or will become evident in the following detailed description and claims, and in the accompanying drawing also forming a part of the disclosure, in which: FIG. 1 is an overall block diagram of the apparatus of the invention; FIG. 2 is a schematic showing of the sample handling portion of the apparatus of the invention; FIG. 3 is a view similar to FIG. 2 showing the valves in a second position; FIGS. 4 and 5 are electrical schematics of portions of the circuitry; FIG. 6 is a full chromatogram of a typical analysis; FIG. 7 is a view similar to FIG. 6 showing an elution time check chromatogram; and FIG. 8 is an analysis as displayed on the raw data recorder during normal use.

Referring to FIG. 1, 10 designates the analyzer and detector section. A box 12 designates the various automatic programming means, and the manual controls. A line 14 connects boxes 10 and 12 on FIG. 1. It is to be understood that line 14, and the other lines on FIG. 1, represent many wires and other tying components which connect the apparatus together. A raw data recorder 16 is provided and is connected to box 12 and therefore into all the other parts of the apparatus by a line 18, as explained above. A box 20 indicates most of the electronics of the invention including the various computing circuits, and the power supply, and is connected to programming and controls group 12 by a line 22. The quantity of each of the three components, aromatics, paraffins, and naphthenes, in the hydrocarbon mixture to be analyzed is displayed on separate recorders 24, 26 and 28, respectively, which are connected into electronics group 20 by lines 30, 32 and 34, respectively. In the embodiment of the invention which has been built and successfully used, all the apparatus is housed in two cabinets with line 22 joining them together.

In overall operation, referring to FIG. 1, a sample to be analyzed is operated upon in analyzer and detector group 10, under the control of programming group 12, while the raw data is fed to recorder 16 and the specific data is fed to electronics group 20. As the analysis and computations progress, and the amounts of the three groups of components in the sample are determined, that information is fed by electronics group 20 to each of the recorders 24, 26 and 28.

Referring now to FIG. 2, analyzer and detector group 10 is shown in detail. It will be understood that lines in FIGS. 2 and 3 represent conduits for the passage of fluids. Group 10 includes a slide type sampling valve 36 having three passageways 38, 40, and 42 therein. Sampling slide valve 36 is interposed in a conduit 44 which may have a continuous flow of the mixture to be monitored therethrough. Conduit 44 may be tapped into a line or pipe carrying the mixture in a refinery or the like, at any convenient location. The volume of passageway 40 is equal to some predetermined amount to which other parts of the apparatus are calibrated, as will appear more clearly below. Passageway 42 is normally positioned in a conduit 46 connecting one side of a first gas-liquid chromatograph (GLC) column 48 to one fixed position on a slide type fluid handling valve 50, which will be referred to as the backflush valve hereinafter, for a reason that will appear below.

In operation, sampling valve 36 is moved downwardly from the position shown in FIG. 2. Passageway 38, which is inactive in the position shown in FIG. 2, is interposed in line 44 so as to maintain flow therethrough, and simultaneously, passageway 40, containing the fluid sample of predetermined amount to be analyzed, is interposed in line 46. The carrier gas, usually helium, in the chromatographic system will push the slug out of the valve, the valve being left in the activated position by the master timer described below for a sufficiently long period of time to permit the slug to be moved on. Passageway 42 will be temporarily inactive, the small amount of carrier gas therein being vented. After the sample is in the system, valve 50 is moved back to the position shown in FIG. 2 by the master timer. The master timer may comprise a constant speed motor having a shaft which carries a plurality of timing cams each of which operates an electric switch, or other suitable means. The cams are formed with lobes of appropriate length and angular relation to each other to achieve proper timing of the components controlled by the switches, as will appear in more detail below.

In the embodiment of the invention which has been built and successfully used, the sample size, volume of passageway 40 in valve 36, was two microliters, and all other sizes are in proportion to this volume. An overall cycle time of 30 minutes is used in the operative embodiment. The first GLC column 48 is about four feet in length, has an outside diameter of about 3/10 of an inch, an inside diameter of about 1/8 of an inch, and is packed with 20 percent CEF on 45/60 Chromosorb-P CEF is N,N - bis(2-cyanoethyl)formamide and Chromosorb-P is a commercial solid support. GLC column 90 is packed with a material which will separate normal paraffins from naphthenes. Specifically, column 90 is about 15 feet long, of about 1/8 inch OD, about 3/32 inch ID, and is packed with 20 percent M&B silicon oil on 60/80 Chromosorb-P. M&B silicone oil is a commercial product obtainable from Applied Science Laboratories, of State College, Pennsylvania. If necessary, for example, to eliminate small quantities of other materials, such as olefins, which may be in the sample other packing materials could be chosen for column 90 so that the paraffin peaks will be distinguishable, as is well known by those skilled in this art.

The carrier gas pressure through column 48 and all the fluid handling parts of the system is about 49 p.s.i.g. Column 48, and the second GLC column 90, are housed in an oven in which a preferred temperature of approximately 99° C. is maintained. A temperature in the range of about 90° C. to 110° C. is acceptable.

Slide type backflush valve 50 comprises a right hand through passageway 52, a left hand through passageway 54, a top side return loop passage 56 and a bottom side return loop passageway 58. One of the two through passageways 52 or 54 is always in an inactive position, and the valve has three fixed positions on each side. The upper left hand fixed position on valve 50 is fed by the other end of line 46 which runs from the sampling valve 36. The upper right hand position on valve 50 is occupied by a conduit 60 which connects said position to the other side of the first GLC column 48. The center upper position of valve 50 is occupied by one end of a conduit 62, the other end of which is connected to the center lower position on a similar valve 64, hereinafter referred to as the column/detector selector valve. The bottom left and right fixed positions on backflush valve 50 are interconnected by a loop conduit 66, and the center bottom position is occupied by a driver gas supply conduit 68, which connects a gas supply 70 to said position on valve 50. Supply 70 is shown diagrammatically only, but it will be understood that it may comprise tanks or other source of helium or the like driver gas, pressure regulators, valves, and other components well known to those skilled in the art.

Selector valve 64 is similar in structure to backflush valve 50, and comprises right and left through passageways 72 and 74, respectively; upper and lower return loop passageways 76 and 78, respectively; and three fixed positions on each of its upper and lower sides. The upper and lower positions on the left side are interconnected by a loop conduit 80, which includes a pressure restrictor device 82 of any suitable type. Device 82 is required to balance carrier gas flow when column 90 is out of the system (FIG. 3 position) to maintain a constant flow across the detector at all times, as will appear more clearly below. The upper center fixed position on selector valve 64 is occupied by a conduit 84 which runs to the detector 86, described below. As previously mentioned, line 62 from backflush valve 50 occupies the lower center middle position on selector valve 64. The upper right hand position of valve 64 is occupied by a conduit 88 which runs to one side of the second GLC column 90, the other side of which is attached to a conduit 92. The opposite end of conduit 92 occupies the lower right hand position on selector valve 64. The operation of the valves appear below.

Detector 86 is of the thermal conductivity type, i.e., differentiation is based on the thermal conductivity of the fluids passing therethrough. The detector compares the thermal conductivity of the sample to a known thermal conductivity, in this case, that of the carrier gas, usually helium. Other suitable detection means may be used. To supply helium for reference purposes, a conduit 94, in parallel connection with supply conduit 60, runs from gas supply 70 to the reference side 86R of detector 86. Supply line 94 includes a pressure restrictor 96 therein, which serves to balance the pressure drops created by the columns 48 and 90, to maintain overall pressure equilibrium in the system. Conduit 84 from selector valve 64 runs to the sample side 86S of the detector 86. Each side of the detector is vented by one of a pair of vents 98 and 100.

Referring now to FIG. 4, there is shown an electric schematic diagram of most of the electronic components of the invention. The apparatus includes a master timer 102 which may comprise a constant speed motor which drives a shaft carrying a plurality of timing cams. Each of the cams control a switch, and the spacing and length of the lobes on the cams achieves proper timing interrelationships between the components controlled by the switches. As shown, master timer 102 comprises fourteen such switches, even numbers 104 through 130 inclusive. One side of each of switches 104 to 114 inclusive are joined to a common line 132 which leads to a voltage amplifier 134, and the other side of each of said switches is joined to detector 86 by a common line 136. Each switch is also individually associated with an adjusting means, identified by the switch number followed by "a," which may be a potentiometer or the like.

One side of each of the remaining switches 116 through 130 inclusive on master timer 102 is connected to a common power supply line 138 from the power supply, not shown. Each of the switches 116 through 130 controls a different component. A line 140 runs from the other side of switch 116 to the chart motor, CM, of the aromatics recorder 24, the other side of which CM is grounded. A line 142 runs from the other side of switch 118 to one side of the coil 144 in a relay 146 and the other side of said coil is grounded. A line 148 runs from the other side of switch 120 to the chart motor, CM, in paraffins recorder 26 and the other side of said chart motor is grounded. A line 150 runs from the other side of switch 122 and controls the operation of sampling valve 36 (shown in FIGS. 2 and 3). A line 152 runs from the other side of switch 124 to one side of a coil 154 on a relay 156 and the other side of said coil is grounded. Lines 158 and 160 run from the other sides of switches 126 and 128 and operate the backflush valve 50 and selector valve 64, respectively. A line 162 runs from the other side of switch 130 to the chart motor, CM, in data recorder 16, and the other side of said chart motor is connected to a common chart motor and pen motor, PM, ground connection 164.

Voltage amplifier 134 receives signals through line 132, amplifies them, and puts them out in a pair of lines 166 adn 168. Means are provided in amplifier 134 to put out the signal in line 168 slightly after that in line 166. This is done so that the pen in recorder 16 will have time to arrive at the peak of the particular signal before any signals are transmitted to integrator 194, as will be explained more fully below.

The signal in line 168 serves as a triggering pulse for a square wave generator 170. A reference pulse, which may comprise ordinary 60 cycle service electricity, is supplied to generator 170 by a source 172. The triggering pulse in line 168 causes generator 170 to put out square wave pulses having a frequency equal to that supplied by source 172, and these pulses are supplied through a line 174 to an electronic timing device 176. Simultaneously with the commencement of output of square waves in line 174, generator 170 supplies a signal through a line 178 to a pair of normally closed contacts 180 in an electronic timer 176. After passing through said normally closed contacts, the signal passes through a line 182 to a coil 184 on a relay 186. A line 188 completes the circuit from the other side of coil 184 back to generator 170.

Relay 186 comprises a pair of normally open contacts 190, one side of which is connected by a line 192 to an integrator or summing device 194. The other side of said contacts 190 is connected by a line 196 to a peak picker and retransmission slide wire portion 16a of recorder 16. A line 198 connects the other side of portion 16a of recorder 16 to integrator or summer 194.

As is known, a retransmission slide wire is a device similar to an elongated rheostat, the moveable member of which is mechanically joined to or otherwise caused to move with the pen or pointer on a recorder. Thus, a signal proportional to the reading on the recorder is always present and can be held on a retransmission slide wire for further use.

Signals proportional to the volume of each of the components in the sample to be analyzed are fed to the integrator 194, and then, after being summed, to each of the aromatics and paraffins recorders 24 and 26, as will appear more clearly in the operation section below. To this end, relay 146 comprises a pair of normally open contacts 200, one side of which is connected to the pen motor, PM, in aromatics recorder 24 by a line 202. The other side of said PM is connected by a line 204 to integrator 194. A line 206 runs from the integrator 194 to the other side of said contacts 200 to complete the aromatics PM recorder circuit.

Relay 156 comprises a pair of normally open contacts 208, one side of which is connected by a line 210 to the pen motor, PM, of the paraffins recorder 26. A line 212 connects the other side of said PM to the paraffin circuit in integrator 194. The paraffin circuit interconnecting integrator 194, recorder 26, and relay 156, includes a manually adjustable multiplier 214, which may comprise a potentiometer or the like. Multiplier 214 serves to make the correction from normal paraffins, which is the component which is detected in detector 86, to total paraffins, which is the figure that is meaningful. In the case of the example being described, the correction factor supplied by multiplier 214 is a number in the range of 1.65 to 1.70. A line 216 runs from integrator 194 to multiplier 214, and a line 218 completes the circuit by interconnecting multiplier 214 with the other side of contacts 208.

Referring now to FIG. 5, there is shown the computing circuitry which performs the equation: $N=1-(P+A)$, wherein N is the percentage of naphthenes in the sample being analyzed, P is the percentage of paraffins, A is the percentage of aromatic compounds, and 1 represents the amount of the original sample. It will be understood that the material with which the invention is used contains compounds in these three groups only. Each of the aromatics and paraffin recorders 24 and 26 comprises a retransmission slide wire 24a and 26a, respectively, of the type described above. A line 218 interconnects the two "0" sides of the two retransmission slide wires. A line 220 connects the 100% side of slide wire 26a to a battery or other source of current 222. A line 224 connects the other side of battery 222 to the 100% side of slide wire 24a. The moveable member associated with wire 24a is connected to a line 226 which includes a resistor 228 therein which serves as a current limiter. Line 226 includes an adjustable tap-off resistor 230, and terminates at junction 232 which is located in a line 234 which runs from the moveable member associated with slide wire 26a to the PM in naphthenes recorder 28. The other side of the naphthenes recorder 28 is connected by a line 236 to a moveable member associated with resistor 230. The function of the variable resistor 230 is to set the voltage in a proper range for recording on recorder 28 and does not move during normal operation.

OPERATION

In FIG. 6, there is shown an actual chromatogram of a typical sample which was made for purposes of illustrating the manner of operation of the invention. The first peak 238, in regard to elution time, is representative of the aromatics in the sample being analyzed. The peak 240 represents $C_5$ normal paraffin compounds, and the peaks 242 through 248 inclusive represent $C_6$ through $C_9$ normal paraffins. The peaks betwen the numbered peaks are generated by the naphthenes and these are separated out in a manner that will be described below.

Analysis begins with insertion of a sample into the system by sampling valve 36. Valve 36 is caused to slide downwardly by the cam associated with switch 122 in master time 102, and the predetermined volume of mixture in passageway 40 is thereby interposed in conduit 46. Before analysis begins, the apparatus as a whole has been brought into temperature and pressure equilibrium during a "warm-up" period. After equilibrium is achieved, the operator starts the motor in master timer 102 to commence the first analysis cycle, and the apparatus will operate continuously and automatically thereafter. Many different means are available to achieve this continuous and automatic operation. For example, in the embodiment of the invention which has been built and successfully used, the apparatus was made to operate continuously and automatically by providing gearing associated with master timer 102 such that the time required for one complete revolution of the shaft carrying the timing cams is equal to or slightly greater than the analysis cycle time, in this case, 30 minutes.

After being interposed in conduit 46, the sample is sent through the first GLC column 48. As described above, the material in column 48 will impede the progress of aromatic compounds therethrough while permitting relatively rapid passage of paraffins and naphthenes. After a predetermined length of time has elapsed from the insertion of the sample into the system, a condition will exist wherein all the aromatic compounds will be located in column 48 and all the naphthene and paraffin compounds will be located in column 90. In the embodiment of the invention which has been built, this time is less than 3.8 minutes. As shown in FIG. 2, the paraffins and naphthenes arrive at column 90 by passage through column 48, conduit 60, loop passageway 56 in valve 50, conduit 62, loop passageway 78 in valve 64, and conduit 92. The predetermined time when this condition will occur is determined by a test called an elution time check. An elution time check chromatogram is shown in FIG. 7. The chromatograms of FIGS. 6 and 7 were drawn by raw data recorder 16 by making appropriate adjustments in various parts of the circuitry.

Once the condition exists wherein all the aromatics are located in column 48 and all the paraffins and naphthenes are located in column 90, the valves 50 and 64 are thrown to the position of FIG. 3 which creates a condition wherein the aromatics may be backflushed through column 48 and sent to detector 86 to be detected as the single peak 238, while simultaneously the paraffins and naphthenes in column 90 are isolated.

Referring now to FIG. 3, the condition after the valves are thrown is shown. The direction of flow of the carrier gas through column 48 is reversed, and this reversal will cause the aromatics, which have been strung out along the length of column 48, to back up onto each other and exit as a single slug. As shown in FIG. 3, the flow path of the driver gas is as follows: conduit 68, loop passageway 58, loop conduit 66, passageway 52, conduit 60, column 48, at which point the driver gas picks up the slug of aromatic compounds. As clearly shown in FIG. 3, the slug of aromatics is then directed through appropriate conduits and valve passageways to finally arrive at the sample side 86S of detector 86.

After a sufficiently long period of time has elapsed for the aromatics to have been detected and recorded, four minutes in the example being described, the switches 126 and 128 on master timer 102 cause the valves 50 and 64 to return to their FIG. 2 positions, whereby flow continues in the same direction as before the aromatics analysis. It will be noted that the direction of flow in conduit 62 which connects the two valves 50 and 64 is always in the same direction, so that when valve 50 returns from the FIG. 3 to the FIG. 2 position, this change has no effect on the system other than to prepare or cock it for the next analysis cycle. However, when valve 64 returns from the FIG. 3 to the FIG. 2 position, continued flow from conduit 62 will drive the paraffins, separated out of the naphthenes by the material in GLC column 90, to the detector side 86S of detector 86.

As shown in FIGS. 6 and 7, the paraffins are individually detected by carbon number, and this spacing determines the interrelationships of the length of the lobes and the angular positioning of the cams associated with the switches 104 through 114 inclusive. While only $C_5$ through $C_9$ compounds are shown, it will be understood that if higher carbon number paraffins were in the sample, additional cams and switches in the master timer will be provided. The variable resistors 104a through 114a inclusive serve to correct the voltage supplied by detector 86 for the thermal conductivity of the particular compounds involved. These elements are not changed once they set. One set of cam settings is good for substantially all crudes. Re-setting is required only when the columns are changed.

The chromatogram of FIG. 8 is the actual output produced by data recorder 16. The peaks on FIG. 8 are analogous to the peaks on FIGS. 6 and 7 and are indicated by the same reference numeral followed by "a." Means are provided in the electronic portions of the apparatus to cause the height of the peaks of FIG. 8 to be directly proportional to the quantity of the particular component being recorded. As is well understood by those skilled in the GLC art, normally, the total area under the peak is proportional to the volume of that compound. By providing a uniform very narrow width to each of the peaks, the height of each peak becomes proportional to total volume of that component.

The manner of operation of each of the paraffin component cams and switches is the same, but the operation is slightly different for the aromatics. Let it be assumed that switch 104 is controlled by the aromatics cam. When the slug of aromatic compounds is sent through the detector 86 and a signal proportional thereto is being supplied by the detector throuhg line 136, switch 104 will be closed by its associated cam and this signal will pass through adjustable resistor 104a, the now closed switch 104, and common line 102 into the voltage amplifier 134. In response to receipt of said signal on line 132, voltage amplifier 134 puts out an amplified signal first in line 166 and then in line 168. The signal in line 168 acts as a triggering pulse for square wave generator 170. Upon being triggered, the generator 170 puts out square wave pulses having a frequency equal to the frequency of the voltage from supply device 172, usually 60 c.p.s. These pulses are simultaneously supplied through line 174 to the electronic timer 176. By counting a predetermined number of said pulses, the timer provides an accurate predetermined length of time during which the circuit controlled by the normally closed contacts 180 on the timer will be activated. During this period, a circuit is completed through the generator 170 and timer 176 to coil 184 of relay 186. By activating the coil 184 for this period of time, the normally open contacts 190 on said relay will be closed only for this precise period of time. The contacts 190 control a circuit between the peak picker and retransmission slide wire portion 16a and the integrator 194 to transmit the peak value only of the particular signal being recorded by recorder 16. This peak value signal is sent to integrator 194 for a length of time equal to the time set on timer 176 as described above.

After the peak value has been supplied to integrator 194 for a period of time equal to the time that contacts 190 are held closed by the electronic timer 176, contacts 190 are then opened. The peak value in the summer 194 is thus multiplied by a time factor which is a constant and a function of the setting of timer 176. After this time, switch 118 on master timer 102 closes. The switch 118 may be called the aromatics read-out switch. Closure of switch 118 causes activation of relay 146 closing the circuit controlled by normally open contacts 200 on said relay. The circuit connects the PM on aromatics recorder 24 to integrator 194 causing the stored value, which automatically has the time factor divided out of it in the integrator, to be fed to the recorder which creates the left hand vertical line on aromatics peak 238a.

The peak picker is a type of circuit which selects the peak value of the motion of the pen as driven by the PM in recorder 16 in response to the signal in line 166, and transmits only this peak value to the integrator 194. Once the pen in recorder 16 has arrived at its peak value, switch 130 on the master timer 102 closes for a short predetermined period of time moving the chart paper a predetermined short distance equal to the length of the top horizontal flat on peak 238a. The pen then returns to the zero line automatically.

The method of handling the paraffin peaks is similar to the above, except that the chart advances created by closure of switch 130 on the master timer are used to create the spaces between peaks rather than to create the top of the peak as in peak 238a. The flats at the tops of peaks 240a to 248a are incidental and are created by the recorder chart motor moving while the peak picker is energized. Assuming that switch 106 is controlled by the paraffin $C_5$ cam, and each of the other switches 108 to 114 are controlled by the paraffin $C_6$ through $C_9$ cams respectively, it will be appreciated that as each cam closes each switch at the proper time of elution of each of the components, a pulse equal to the peak value of the curve for that component, as selected by peak picker 16a, times the time constant supplied by electronic timer 176, will be fed to integrator 194. Switch 130 will create chart advances of equal duration, four seconds for example, between each of the paraffin peaks, at the base thereof. After values for all the paraffin peaks are stored in and are summed up by integrator 194, switch 124 on the master timer will be closed in response to its cam which may be called the paraffins read-out cam. When switch 124 is closed, normally open contacts 208 on relay 156 are closed, and a circuit is completed between the PM on paraffin recorder 26, multiplier 214, and lines 216 and 212 from the integrator. Lines 216 and 212 supply a signal from integrator 194 proportional to the total value of the sum of all the paraffins with the constant time factor supplied by electronic timer 176 automatically divided out of it.

The detector used can detect only normal paraffins and it is desired to record total paraffins. It is known that total paraffins equals normal paraffins times some fixed constant. This constant is supplied by multiplier 214. For the materials with which the invention has been successfully used the constant is a number in the range of 1.65 to 1.70.

It is noteworthy that the present invention automatically provides trend type recording in the three recorders 24, 26, and 28. That is, since the PM in each recorder is supplied with a signal equal to the total value it is desired to record, the pen moves only the difference between the last value recorded and the present value supplied. Any automatic pen return mechanisms that may be present in the recorders are removed.

Each of the recorders 24 and 26 is provided with automatic, constant increment chart advance means to move the respective chart a predetermined constant amount between readings. To this end, two switches 116 and 120 on the master timer 102 control the chart motors in the recorders 24 and 26 to advance the charts therein a predetremined amount after each reading. Similar structure, not shown, is provided for the naphthenes recorder 28.

Since the samples being analyzed contain only compounds in the aromatics, paraffins, and naphthenes groups, it is possible to obtain the amount of naphthenes by subtraction of the amount of paraffins and aromatics from the total sample. To this end, referring to FIG. 5, there is provided a computing circuit which calculates the equation: $N=1-(P+A)$. Each of the aromatic and paraffin recorders 24 and 26 is provided with a retransmission slide wire 24a and 26a respectively. By providing opposite to each other reading scales on the two slide wires, a voltage proportional to unity minus the readings on the two aromatic and paraffin recorders will be present on resistor 230 and will be read out by recorder 28. The voltage drop between lines 224 and 226 will be equal to the battery voltage less the amount of aromatics, and the voltage drop between lines 220 and 234 will be equal to battery voltage minus the amount of paraffins. Thus, the voltage detected at resistor 230 will be equal to battery voltage minus amount of paraffins and minus amount of aromatics, and this will be proportional to amount of naphthenes and will be recorded directly on naphthenes recorder 28. By adjustment of the moveable member on line 236 associated with resistor 230, the voltage drop across resistor 230 is made proportional to the amount of the sample originally put into the system by the sampling valve.

While the invention has been described in detail above, it is to be understood that this detailed description is by way of example only, and the protection granted is to be limited only within the spirit of the invention and the scope of the following claims.

We claim:
1. Apparatus for separating the components of a fluid mixture consisting of three of said components comprising first separation means for separating a first component from said fluid, second separation means for separating the remaining two components from each other, fluid handling valve means, detection means for detecting the quantity of a fluid passed therethrough; conduit means interconnecting said first separation means, said second separation means, said valve means, and said detection means; said valve means being moveable to a first position wherein said first and second separation means and said detection means are in series connection through said conduit means and through said valve means; said valve means being moveable to a second position wherein said first separation means is in series connection with said detection means through said conduit means and portions of said valve means and wherein said second separation means is isolated from said series connection through said conduit means and other portions of said valve means; electrical circuit means comprising recording means for each of said components; and means for computing the quantity of the third component in a sample including means for summing the quantities of said first and second components determined by said detection means, means for subtracting the sum of the quantities of said first and second components from the total amount of the sample, and means for recording the quantity of said sample remaining after the sum of the quantities of the first and second components therein has been subtracted from the total amount of the sample.

2. The combination of claim 1, and master timer means for controlling the sequencing of and duration of operation of said recording means and said means for computing.

3. The combination of claim 1, wherein said fluid is a mixture of hydrocarbons consisting of aromatics, paraffins, and naphthenes, wherein said first component is aromatics, and said second component is paraffins, and wherein said first and second separation means comprise chromatographic columns.

4. The combination of claim 3, and means for heating said chromatographic columns to a temperature in the range of about 90° C. to about 110° C., said first chromatographic column having a length of about four feet, an internal diameter of about 1/8 inch, and being packed with 20 percent CEF on Chromosorb-P.

5. The combination of claim 3, and means for heating said columns to a temperature in the range of about 90° C. to about 110° C., said second chromatographic column having a length of about fifteen feet, an internal diameter of about 3/32 inch, and being packed with 20 percent M&B silicone oil on Chromosorb-P.

6. The combination of claim 3, and a source of driver gas, said valve means comprising a backflush valve and a column selector valve, and said conduit means comprising conduit portions interconnecting said source and said backflush valve, said backflush valve and said column selector valve, and said column selector valve and said detection means, whereby the positions of said backflush valve and of said column selector valve define said first and second positions of said valve means, and whereby fluid will flow in opposite directions in said first separation means in said first and second positions of said valve means, respectively.

7. A method of automatically analyzing and determining the quantity of each component of a sample of a fluid containing a plurality of said components by gas-liquid chromatography, comprising the steps of flowing the sample through a first chromatographic column which impedes the progress of one component therethrough while permitting relatively rapid passage of the other components therethrough, flowing said other components into a second chromatographic column while said first component is in said first column, isolating said other components in said second column, reversing the direction of flow through said first column to flow said first component out of said first column as a slug, flowing said slug of said first component to detection means, determining the quantity of said first component, continuing flow of said other components through said second column which separates a second component from said other components, flowing the outflow of said second column to said detecting means, determining the quantity of said second component, wherein said second component comprises paraffin group compounds; wherein the step of determining the quantity of said paraffin group compounds is performed by detecting the amount of each normal paraffin compounds in said group, generating a signal porportional to the amount of each such normal paraffin compound, sending each such signal proportional to the amount of each normal paraffin compound to summing means, summing all of said signals proportional to each of the normal paraffin compounds in said paraffin group in said summing means, generating a signal in said summing means proportional to the amount of all said normal paraffin compounds, transforming said signal proportional to the amount of said normal paraffin compounds from said summing means to a signal proportional to the amount of total paraffin compounds, and recording said last-mentioned signal.

8. An electrical circuit for use in a chromatographic method of quantitatively separating a fluid mixture into its components, to successively pass each component through detection means, and individually recording the amounts of the various components in successive samples, said circuit comprising detection means for generating an electrical signal proportional to the quantity of a fluid passed therethrough, recording means for recording the signals produced by said detection means, means for selecting a predetermined portion of each of the signals recorded by said recording means, means for storing the predetermined portion of each signal selected by said selector means, read-out means for reading out certain of said selected portions of said signals from said storage means proportional to the quantity of each of the components of said mixture, master timer means for controlling the sequencing of and duration of operation of said recording means and said read-out means, and predetermined period timer means operable by said master timer means and cooperable with said signal selector means for causing each predetermined portion of each signal selected by said selector means to be supplied to said storage means for the predetermined period of said predetermined period timer means.

9. The combination of claim 8, said predetermined period timer means comprising a source of alternating current of known frequency, a wave generator for producing waves of predetermined shape, means for connecting said source to said wave generator, said predetermined period timer means further comprising a counter for counting a predetermined number of waves from said wave generator, and switch means in said counter means for breaking the portion of said circuit interconnecting said signal selector means and said storage means in response to said counter completing counting said predetermined number of waves.

10. The combination of claim 8, wherein one of said components detected by said detection means comprises normal paraffin compounds, said recording means comprising paraffin recording means, means operable by said master timer means joining said storage means and said paraffin recording means, and said signal selector means comprising means to select the peak value of each signal supplied thereto from said detection means.

11. The combination of claim 8, wherein one of said components consists of normal paraffin compounds, said recording means comprising paraffin recording means, means operable by said master timer means joining said storage means and said paraffin recording means, and said joining means including signal multiplier means for multiplying signals supplied thereto by a conversion factor proportional to the conversion factor to change normal paraffins to total paraffins, whereby a signal from said storage means proportional to normal paraffins will be transformed by said signal multiplier means into a signal proportional to total paraffins for recordation by said paraffin recording means.

12. The combination of claim 8, said storage means comprising an integrator circuit.

13. The combination of claim 8, said signal selector means comprising a peak picker circuit and a retransmission slide wire.

References Cited

UNITED STATES PATENTS

| 3,030,798 | 4/1962 | Lichtenfels | 73—23.1 |
| 3,095,728 | 7/1963 | Kindred | 73—23.1 |
| 3,385,101 | 5/1968 | Roof | 73—23.1 |

OTHER REFERENCES

Catalog No. 9, Applied Science Laboratories, Spring 1965, p. 10.

Multiple Columns in Chromatography, Baker et al., Control Engineering, January 1961, pp. 77–81.

Chromosorb Products (FF–101A), Johns-Manville Publication, June 1965, p. 1.

RICHARD C. QUEISSER, Primary Examiner

G. E. SNEE III, Assistant Examiner

U.S. Cl. X.R.

23—255; 55—197